(12) United States Patent
Ostberg et al.

(10) Patent No.: US 7,644,696 B2
(45) Date of Patent: Jan. 12, 2010

(54) INTERNAL COMBUSTION ENGINE SYSTEM, AND A METHOD IN SUCH AN ENGINE SYSTEM

(75) Inventors: Claes Ostberg, Lilla Edet (SE); Jan-Ola Olsson, Gothenburg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 13 days.

(21) Appl. No.: 12/123,651

(22) Filed: May 20, 2008

(65) Prior Publication Data

US 2008/0319635 A1 Dec. 25, 2008

(30) Foreign Application Priority Data

Jun. 20, 2007 (EP) .................................. 07110703

(51) Int. Cl.
*F02B 3/00* (2006.01)
*F02B 5/00* (2006.01)
(52) U.S. Cl. .................. 123/299; 123/305; 701/103
(58) Field of Classification Search .................. 123/294, 123/299, 300, 304, 305, 478, 673; 701/103, 701/104, 105
See application file for complete search history.

(56) References Cited

U.S. PATENT DOCUMENTS 3,924,598 A * 12/1975 Davis .......................... 123/306

(Continued)

FOREIGN PATENT DOCUMENTS

DE 19810935 9/1999

(Continued)

OTHER PUBLICATIONS

Urushihara, T. et al, "Expansion of HCCI Operating Region by the Combination of Direct Fuel Injection, Negative Valve Overlap and Internal Fuel Reformation," SAE Technical Papers, No. 2003-01-0749, Mar. 3, 2003, XP002448932, Warrendale, Pennsylvania.

(Continued)

*Primary Examiner*—John T Kwon
(74) *Attorney, Agent, or Firm*—Allan J. Lippa; Alleman Hall McCoy Russell & Tuttle LLP (57) ABSTRACT

An embodiment of the invention relates to an engine system, and a method in an engine system comprising an internal combustion engine having at least one cylinder (2) at which a piston (3), at least one inlet valve (5), at least one exhaust valve (7), and fuel injection means (11), for injection of fuel directly into the cylinder (2), are provided. The method comprises performing the following steps in at least one of the at least one cylinder: controlling (204) at least one of the at least one intake valve (5) so as to introduce air into the cylinder (2), performing (203, 206) at least one main combustion fuel injection (P21, P22) for a main combustion with air introduced into the cylinder (2), controlling (201), during an exhaust stroke and an intake stroke, the intake and exhaust valves (5, 7) so as to form a negative valve overlap (NVO) to capture main combustion residues, and performing (202) at least one pilot fuel injection (P1) during the negative valve overlap. The amount of fuel in the at least one pilot fuel injection (P1) is at least partly dependent on said introduction of air and at least one of the at least one main combustion fuel injection (P21, P22).

16 Claims, 4 Drawing Sheets

U.S. PATENT DOCUMENTS

| | | |
|---|---|---|
| 6,907,858 B2 * | 6/2005 | Miura .................. 123/299 |
| 6,994,077 B2 * | 2/2006 | Kobayashi et al. ..... 123/568.11 |
| 2004/0098190 A1 * | 5/2004 | Nakayama et al. .......... 701/104 |
| 2004/0134462 A1 * | 7/2004 | Strom et al. ................ 123/294 |
| 2004/0173180 A1 * | 9/2004 | Strom et al. ................ 123/299 |
| 2005/0022778 A1 * | 2/2005 | Miura .................. 123/299 |
| 2005/0229903 A1 * | 10/2005 | Kobayashi et al. .......... 123/435 |
| 2006/0174853 A1 * | 8/2006 | Koopmans ................ 123/295 |
| 2007/0137611 A1 * | 6/2007 | Yu et al. .................... 123/304 |
| 2008/0283022 A1 * | 11/2008 | Kim .................. 123/25 R |

FOREIGN PATENT DOCUMENTS

WO    2005/038220    4/2005

OTHER PUBLICATIONS

Koopmans, L. et al., "Direct Gasoline Injection in the Negative Valve Overlap of a Homogeneous Charge Compression Ignition Engine," SAE Technical Papers, No. 2003-01-1854, May 19, 2003, XP002448933, Warrendale, Pennsylvania.

* cited by examiner

INTERNAL COMBUSTION ENGINE SYSTEM, AND A METHOD IN SUCH AN ENGINE SYSTEM

CROSS REFERENCE TO PRIORITY APPLICATION

This present application claims priority to European Application Number 07110703.1, filed Jun. 20, 2007, entitled "An Internal Combustion Engine System, and a Method in such an Engine System", naming Claes Ostberg and Jan-Ola Olsson as inventors, the entire contents of which are incorporated herein by reference.

BACKGROUND AND SUMMARY

In Homogenous Charge Compression Ignition (HCCI) operation of internal combustion engines, the temperature of the charge for the combustion should not be too low. If the temperature is too low, the combustion will be phased lately, resulting in a lower efficiency, and if even later also increased carbon oxide (CO) and hydro carbon (HC) emissions. At an even lower temperature, the combustion will fail to appear, i.e. there will be a misfire, resulting in decreased comfort for persons in a vehicle in which the engine is operating.

In order to solve this problem, U.S. Pat. No. 7,194,996B2 suggests in a direct fuel injection engine during HCCI operation performing a pilot fuel injection during a negative valve overlap at an exhaust stroke and an intake stroke of the piston, in order for the pilot fuel to react with residuals from a previous combustion. Subsequently, air and additional fuel are introduced during the intake stroke and/or a compression stroke for the main combustion. The purpose of the pilot fuel and residual reaction is to heat the charge for the subsequent main combustion. The heated charge will prevent the main combustion from occurring too late.

Although this known method has proven advantageous, there is still use for a solution increasing the combustion control at HCCI operation. For example, a reaction with the fuel from the pilot injection requires a presence of oxygen in the residuals, and therefore the preceding main combustion has to take place with a lean mixture so that there is a surplus of air, some of which is retained during the negative valve overlap. However, the inventors have discovered that an excess of pilot fuel, providing a rich mixture with the air in the residuals, has a cooling effect on the charge for the subsequent main combustion.

Thus, in one embodiment, a method for an engine system is provided, the engine system including an internal combustion engine having at least one cylinder at which a piston, at least one inlet valve, at least one exhaust valve, and a fuel injector for injection of fuel directly into the cylinder. The method comprises performing the following in at least one of the at least one cylinder:

controlling at least one of the at least one intake valve so as to introduce air into the cylinder, performing at least one main combustion fuel injection for a main combustion with air introduced into the cylinder, controlling, during an exhaust stroke and an intake stroke, the intake and exhaust valves so as to form a negative valve overlap to capture main combustion residues, and performing at least one pilot fuel injection during the negative valve overlap; and where an amount of fuel in the at least one pilot fuel injection is at least partly dependent on said introduction of air and at least one of the at least one main combustion fuel injection In this way, it is possible to ensure that the pilot fuel amount is not in excess in view of the oxygen amount in the residuals, in order to avoid un-oxidized pilot fuel to cool down the charge for the next main combustion. Thus, it is possible to improve combustion stability at homogenous charge compression ignition operation of an internal combustion engine. Further, it is also possible to increase efficiency at homogenous charge compression ignition operation of an internal combustion engine. Further still, it is possible to decrease emissions at homogenous charge compression ignition operation of an internal combustion engine. Finally, it is also possible to to reduce risks of discomfort for persons in a vehicle in which the engine is operating with homogenous charge compression ignition.

Also, by the above operation it can be ensured that enough pilot fuel is injected in view of the oxygen amount in the residuals in order to reach enough heating of the charge for the main combustion.

A late main combustion at HCCI operation will reduce the combustion efficiency and the thermodynamic efficiency. By avoiding cooling of the main combustion charge, risks of a late main combustion are reduced, which will increase engine efficiency, reduce fuel consumption, and reduce risks of increased CO and HC emissions. Also, passenger comfort in a vehicle in which the engine is operating is secured, since risks of misfire will be reduced.

Regarding the different steps of the example method, the step of performing at least one main combustion fuel injection for a main combustion could be done by performing the at least one main combustion fuel injection during an intake stroke and/or during a compression stroke of the piston. The step of controlling the intake and exhaust valves to form a negative valve overlap to capture residues from the main combustion, can be carried out by closing the exhaust valve during an exhaust stroke of the piston following immediately upon a power stroke of the piston, in turn following immediately upon said compression stroke, and opening the intake valve during an intake stroke of the piston following immediately upon said exhaust stroke, to form a negative valve overlap between said exhaust valve closing and said intake valve opening.

It should be noted that the intake stroke and the power stroke are defined as periods during which the piston moves downward from the top dead centre (TDC) position to the bottom dead centre (BDC) position, regardless of positions of the inlet valve(s) and the exhaust valve(s) during this downward movement. Similarly, the exhaust stroke and the compression stroke are defined as periods during which the piston moves upward from the BDC position to the TDC position, regardless of positions of the inlet valve(s) and the exhaust valve(s) during this upward movement.

In another example, the method may comprise:

introducing a first amount of air into the cylinder, performing the at least one main combustion fuel injection for a main combustion with air in the first amount of air, capturing, during the negative valve overlap, residues from the main combustion, and determining the amount of fuel in the at least one pilot fuel injection at least partly based on said first amount of air and the amount of fuel injected in at least one of the at least one main combustion fuel injection.

This means that each pilot fuel can be determined at least partly based on the amount of fuel injected and the amount of air introduced for the main combustion preceding the pilot fuel injection, which will result in a very accurate fuel amount determination.

The first amount of air can be introduced into the cylinder by controlling the intake valve so as to be open during at least a part of an intake stroke and/or during a part of a compression stroke of the piston. The introduced amount of air can be the amount of air allowed into the cylinder, or the amount of air captured in the cylinder. If the intake valve closes in the compression stroke, some air allowed into the cylinder may be pushed back into the air intake duct, and thereby the mount of air allowed into the cylinder and the amount of air captured in the cylinder would differ. Which of these amounts correspond to the amount of air introduced into the cylinder, as stated in claim 1, would depend on the manner in which air transportation to the cylinder is determined. The introduced amount of air may be regarded as the amount of air captured in the cylinder.

In still another alternative, the method comprises:

determining a flow of air into the cylinder, determining a flow of fuel for a plurality of main combustion fuel injections for a plurality of main combustions with air introduced into the cylinder, and determining the amount of fuel in the at least one pilot fuel injection (P1), at least partly based on the flow of air and the flow of fuel for the plurality of main combustion fuel injections (P21, P22).

For example, the amount of fuel in the at least one pilot fuel injection can be determined based on a flow of fuel for a plurality of pilot fuel injections, in turn determined at least partly based on the flow of air and the flow of fuel for the plurality of main combustion fuel injections.

In the art, the ratio, between the actual air/fuel ratio and the stoichiometric air fuel ratio, is referred to as the lambda value. The amount of fuel in the at least one pilot fuel injection may be such that the lambda value of a charge with the amount of fuel in the at least one pilot fuel injection and a second amount of air in the residues from the main combustion captured in the negative valve overlap is higher than a predetermined lambda threshold value. In one example, the predetermined lambda threshold value is 1. Thereby, it is ensured that substantially all pilot fuel will be consumed in a reaction with oxygen in the residuals, so that un-oxidized pilot fuel will not cool down the charge for the next main combustion.

The amount of fuel in the at least one pilot fuel injection may be such that said lambda value is within the range of 1.0-1.6. Keeping the lambda value within this range will secure avoiding said cooling effect and still provide enough pilot fuel to obtain a reaction with residual oxygen for a sufficient heating of the main combustion charge.

Additionally, one of the at least one main combustion fuel injection is a first main combustion fuel injection and another of the at least one main combustion fuel injection is a second main combustion fuel injection, the amount of fuel in the at least one pilot fuel injection being determined partly based on the first and second main combustion fuel injections. Thereby, where there are a plurality of main combustion fuel injections for each main combustion, based on the amount of air and the total amount of fuel injected for the previous main combustion, it is possible to properly determine the amount of oxygen in the trapped residuals at the pilot injection. As exemplified below, the first main combustion fuel injection can be a main fuel injection effected at the intake stroke during the negative valve overlap and after a reaction between a previous pilot injection and residual oxygen, and the second main combustion fuel injection can be a post fuel injection effected during the subsequent compression stroke shortly before the main combustion.

DESCRIPTION OF THE FIGURES

Below, embodiments of the invention will be described in detail with reference to the drawing, in which.

DETAILED DESCRIPTION

Figure 1:
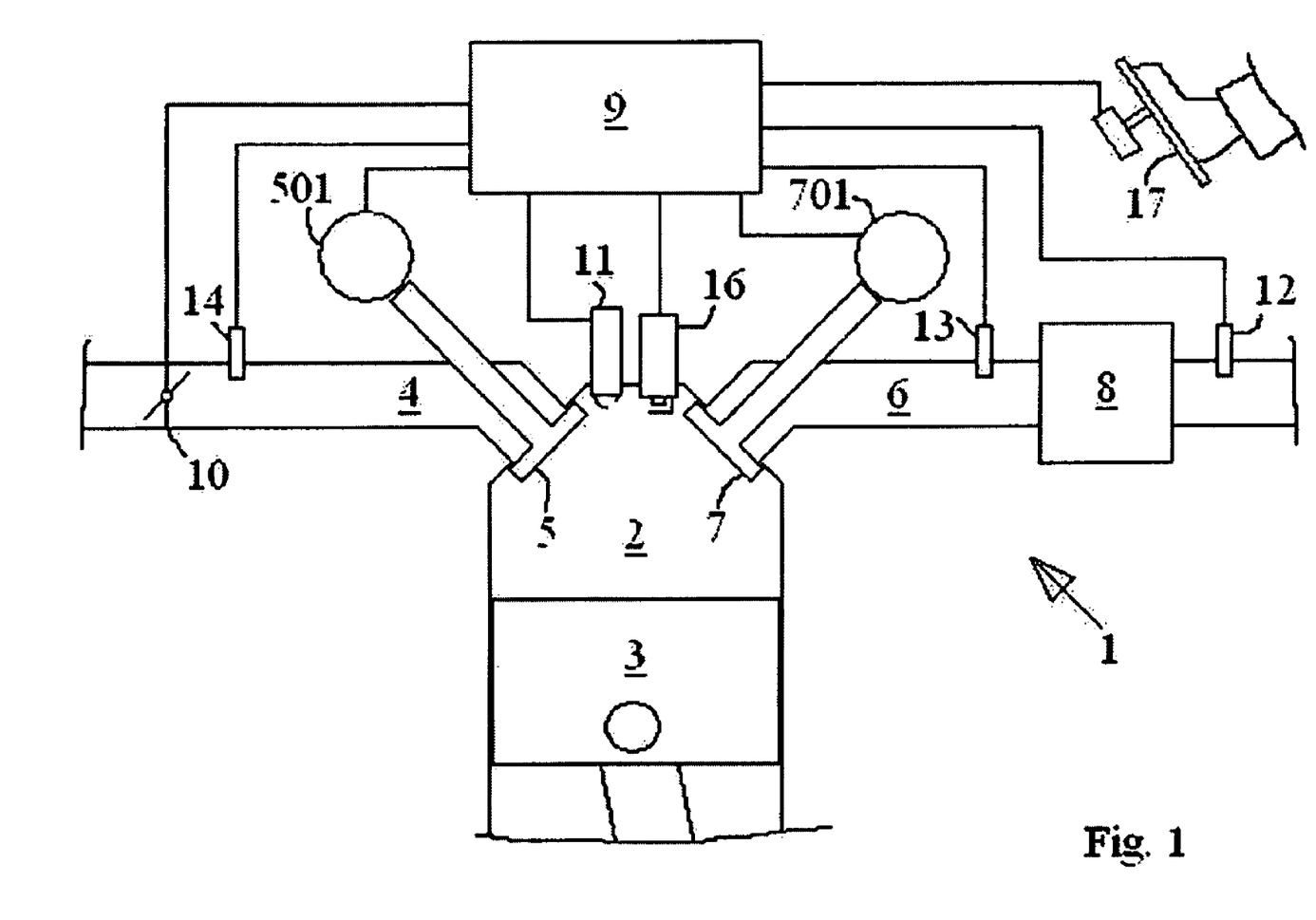
FIG. 1 shows schematically parts of an engine system.

FIG. 1 shows a schematic view of parts of an engine system 1 comprising an internal combustion engine. The engine comprises at least one cylinder 2 with a reciprocating piston 3. Communication between the cylinder 2 and an intake duct 4 is controlled by at least one inlet valve 5, and communication between the cylinder 2 and an exhaust duct 6 is controlled by at least one exhaust valve 7.

The engine system 1 also comprises an engine control unit (ECU) 9, which can be provided as one unit, or as more than one logically interconnected physical units.

Inlet valve control means 501 and exhaust valve control means 701 are provided and controllable by the ECU 9 for controlling opening and closing timing of the inlet valve(s) 5 and the exhaust valve(s) 7, respectively. The valve control means 501, 701 can comprise camshafts and a variable valve timing (VVT) system and/or a cam profile shifting (CPS) system, for the valve timing control. Alternatively, the valve control means 501, 701 can comprise electrically, pneumatically or hydraulically driven actuators for individual control of the respective valves 5, 7.

The ECU 9 is adapted to control fuel injection means 11 comprising a fuel injector 11 at each cylinder 2, adapted to inject fuel directly into the respective cylinder. The fuel injection means 11 communicate with fuel storage means in the form of a fuel tank, via a fuel pump, (not shown). The ECU 9 is also adapted to control air flow control means comprising a throttle valve 10 in the intake duct 4.

In addition, the ECU 9 is also adapted to determine the engine air flow based on signals received from an air flow sensor 14 located in the intake duct 4. As an alternative, as is known in the art, the air flow can be computed based on parameters such as the inlet manifold pressure, throttle position, engine speed, inlet temperature, and/or atmospheric pressure. Manners of determining the values of these parameters are known in the art, and not explained further here.

Further, at each cylinder, ignition means 16 comprising a spark plug 16 are provided and controllable by the ECU 9.

The ECU is also adapted to adjust, as known in the art, the value of a requested torque parameter based on signals from an accelerator pedal 17 in the vehicle, and adjust fuel and air supply to the cylinder(s) at least partly based on the requested torque parameter value. In addition, downstream from the cylinder(s) 2, an exhaust gas treatment device 8, in the form of a catalytic converter, is provided, and the ECU 9 is adapted to receive signals from a first gas sensor 12 located downstream of the catalytic converter 8, as well as from a second gas sensor 13 located in the exhaust duct 6 between the cylinder 2 and the catalytic converter 8. Thereby, the ECU 9 is adapted to determine, based on the signals from the first and second sensors 12, 13, the oxygen content in the exhaust gases upstream and downstream, respectively, of the catalytic converter 8.

Figure 2:
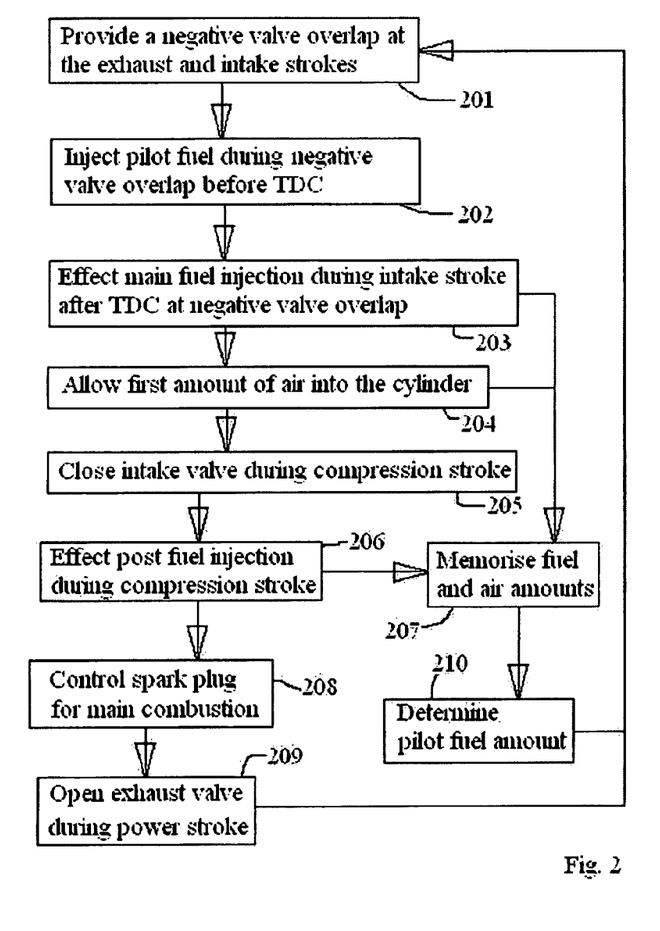
FIG. 2 is a block diagram depicting steps in a method according to one example embodiment of the invention.
Figure 3:
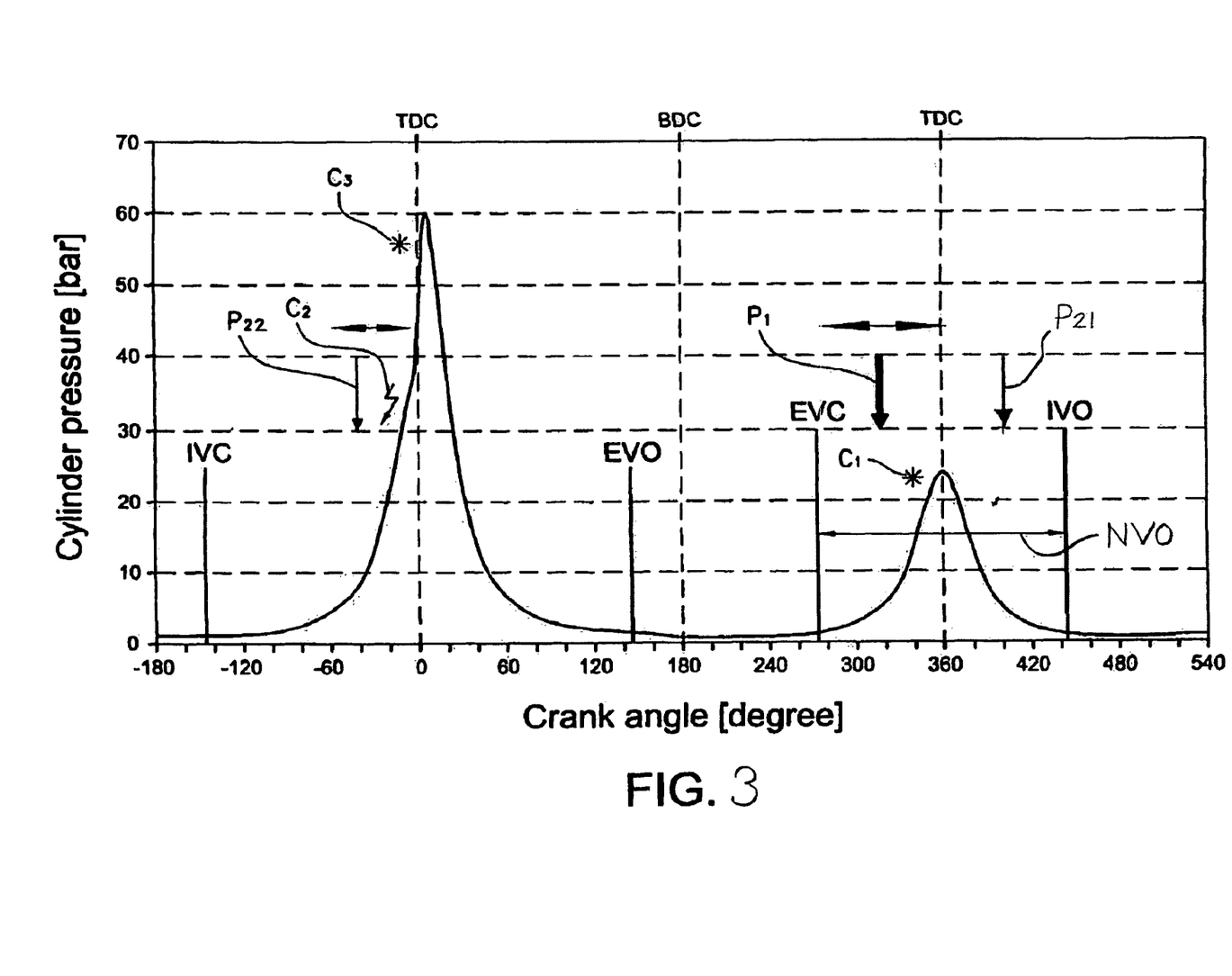
FIG. 3 is a diagram showing cylinder pressure and events in a cylinder of the engine system as functions of the crankshaft angle during steps of the method in FIG. 2.

With reference to FIG. 2 and FIG. 3, a method according to an embodiment of the invention will be described. FIG. 2 depicts steps of the method, and FIG. 3 shows a full cycle of the operation in one of the cylinders of the engine.

The inlet valve control means 501 and exhaust valve control means 701 are controlled so that during the exhaust stroke and the intake stroke, the intake and exhaust valves 5, 7 form 201 a negative valve overlap (FIG. 3, NVO) to capture residues from a previous main combustion, C3. More specifically, the exhaust valve 7 closes, EVC, during the exhaust stroke, and the intake valve 5 opens, IVO, during the intake stroke, to form the negative valve overlap, NVO.

During the negative valve overlap, NVO, before the top dead centre (TDC) position of the piston 3, a pilot fuel injection, P1, is performed 202. The amount of fuel in the pilot fuel injection, here also called pilot fuel, is determined as described below. The pilot fuel reacts, C1, with oxygen in the trapped residuals. The reaction during the negative valve overlap, NVO, is in this example triggered by compression of the mixture, but alternatively, the spark plug 16 can be controlled to trigger the reaction.

During the negative valve overlap, NVO, after the TDC position, and after the pilot fuel reaction, C1, with oxygen in the trapped residuals, a first main combustion fuel injection, P21, here also referred to as a main fuel injection, P21, is performed 203. Subsequently, the intake valve 5 is opened so as to introduce 204 a first amount of air into the cylinder 2. Subsequently, during the compression stroke, the intake valve 5 closes 205, IVC, and thereafter, a second main combustion fuel injection, P22, here also referred to as a post fuel injection, P22, is performed 206.

The first amount of air is dependent on the setting of the throttle valve 10, and based on signals from the air flow sensor 14 in the intake duct 4, the first amount of air can be determined accurately. The amount of fuel in the main fuel injection, P21 and the post fuel injection, P22, as well as the first amount of air, are based on the requested torque and on signals from the first and second gas sensors 12, 13. The main and post fuel injections, P21, P22, and the first amount of air are adapted so as to provide a lean mixture for the subsequent main combustion, which will provide an excess of oxygen, part of which, herein referred to as a second amount of air, will be trapped during the next negative valve overlap, as described below. The fuel amounts in main and post fuel injections, P21, P22, and the first amount of air are memorized 207 by the ECU 9.

Shortly after the post fuel injection, the spark plug 16 is controlled 208 so as to trigger the main combustion, C3. Alternatively, the main combustion can be triggered by compression of the air/fuel mixture. Subsequently during the power stroke, the exhaust valve 7 is opened 209, EVO.

Also, based on the memorized fuel amounts in main and post fuel injections, P21, P22, and the first amount of air, the amount of fuel in the next pilot fuel injection, P1, is determined 210. Thereby, the amount of fuel in the pilot fuel injection, P1, is determined such that the lambda value of the charge with the amount of fuel in the pilot fuel injection, P1, and the second amount of air in the residues from the main combustion captured in the negative valve overlap is higher than a predetermined lambda threshold value, $\lambda_{thres}$. In one example, said predetermined lambda threshold value is 1. In cases where the pilot fuel is not fully mixed with the air in the captured residues, the lambda threshold value, $\lambda_{thres}$, can be chosen to be higher, e.g. 1.2-1.3.

The maximum amount $m_{pilot}$ of pilot fuel, defined for example by its mass, can be determined as $$m_{pilot} = x \cdot \left( \frac{m_{air}}{stoich} - m_{fuel} \right) \cdot \frac{1}{\lambda_{thres}}$$

where $m_{air}$ is the first amount (mass) of air introduced for the previous main combustion, $m_{fuel}$ is the total amount (mass) of fuel injected at the main combustion fuel injections, P21, P22, stoich is the stoichiometric relationship between air and fuel (approximately 14.6 for petrol), x is the amount (mass) of residuals in relation to the total amount (mass) of exhausts. The total amount of exhausts can be determined based on the first amount of air $m_{air}$, the amount $m_{fuel}$ of fuel injected at the main combustion fuel injections, and the amount of pilot fuel injected before the main combustion fuel injections, for example as the sum of the masses of these air and fuel amounts.

Figure 4:
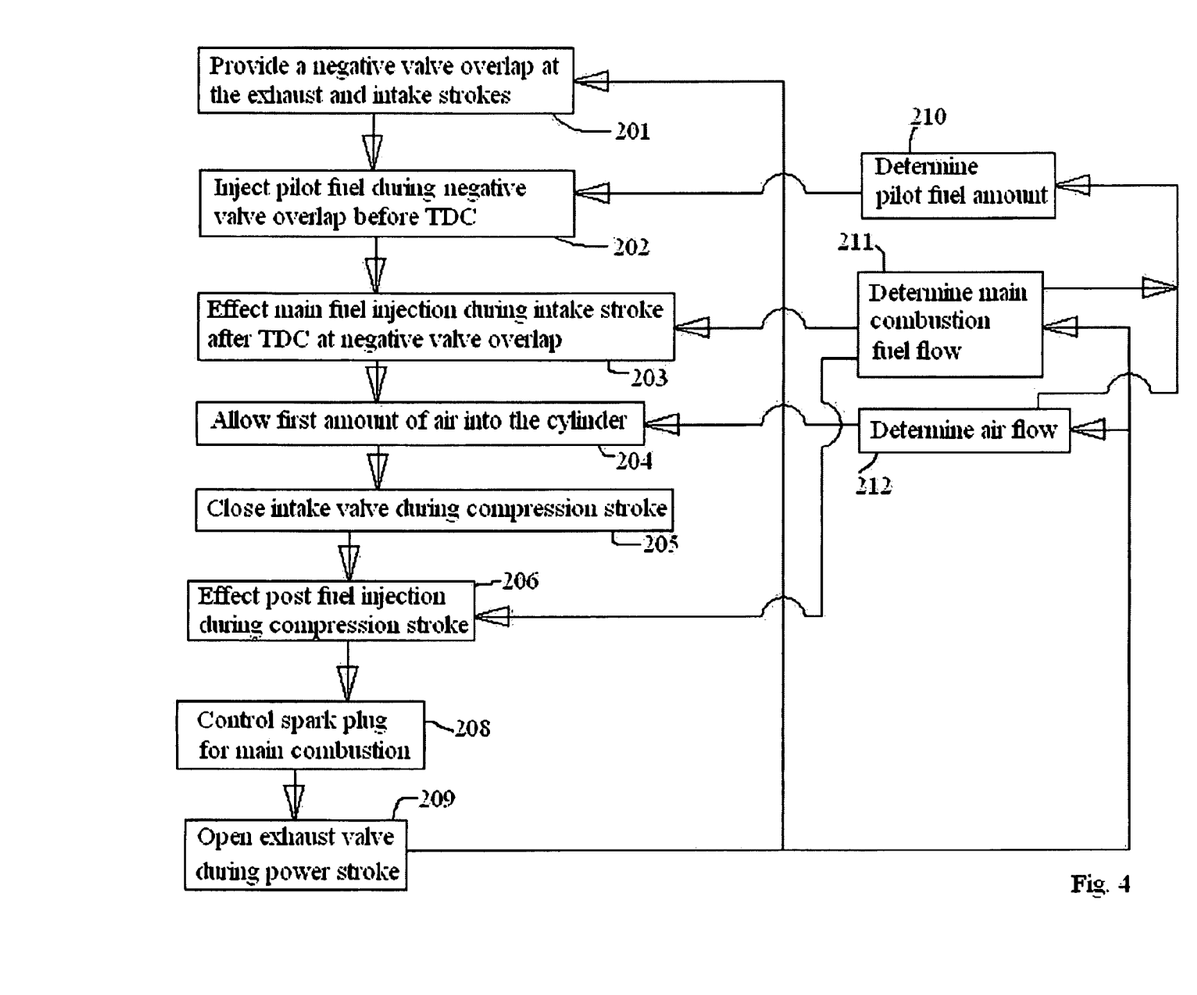
FIG. 4 is a block diagram depicting steps in a method according to an alternative embodiment of the invention.

FIG. 4 depicts steps in a method according to an alternative embodiment of the invention. As in the embodiment described with reference to FIG. 2, a negative valve overlap is formed 201 to capture residues from a previous main combustion, C3, and a pilot fuel injection, P1, is performed 202 during the negative valve overlap. The amount of fuel in the pilot fuel injection is determined as described below. During the negative valve overlap, after the pilot fuel reaction, C1, with oxygen in the trapped residuals, a main fuel injection, P21, is performed 203, and subsequently a first amount of air is introduced 204 into the cylinder 2, the intake valve 5 closes 205, and a post fuel injection, P22, is performed 206. Thereafter, the spark plug 16 triggers 208 the main combustion, C3, and subsequently, the exhaust valve 7 is opened 209.

Continuously, a flow of fuel for a plurality of main and post fuel injections, herein also referred to as a main fuel flow, is determined, i.e. adjusted 211. Also, a value of an air flow to the engine or the respective cylinders 2 is continuously determined, i.e. adjusted 212. The air flow and main fuel flow are based on the requested torque and on signals from the first and second gas sensors 12, 13. Said steps of performing the main fuel injection 203, and performing the post fuel injection 206 are based on the determined main fuel flow 211, and the step of introducing a first amount of air 204 is based on the determined air flow 212.

Also, said step of performing the pilot fuel injection 202, is based on a determination 210 of a pilot fuel amount, which is carried out based on the main fuel flow 211 and the air flow 212. As an example, the maximum pilot fuel flow $\dot{m}_{pilot}$ can be determined as $$\dot{m}_{pilot} = x \cdot \left( \frac{\dot{m}_{air}}{stoich} - \dot{m}_{fuel} \right) \cdot \frac{1}{\lambda_{thres}}$$

where $\dot{m}_{air}$ is the air flow, $\dot{m}_{fuel}$ is the main fuel flow, stoich is the stoichiometric relationship between air and fuel (approximately 14.6 for petrol), x is the flow of residuals in relation to the total flow of exhausts. The total flow of exhausts can be determined based on the air flow $\dot{m}_{air}$ and the total fuel flow.

It should be noted that in alternative embodiments, there could be more than one pilot fuel injection, P1, during the negative valve overlap. Thereby, in one example, the lambda value of total amount of fuel in the pilot fuel injections and the second amount of air in the residues captured in the negative valve overlap is higher than 1.

It should also be noted that in alternative embodiments, there could be less or more than two main combustion fuel injections, P21, P22. For example, the cycle could be performed without the post fuel injection, P22. Thereby, the amount of fuel in the next pilot fuel injection, P1, can be determined based only on the fuel amount in main fuel injection, P21, and the first amount of air. Alternatively, the cycle could be performed without the main fuel injection, P21. Thereby, the amount of fuel in the next pilot fuel injection, P1, can determined based only on the fuel amount in the post fuel injection, P22, and the first amount of air.

In one example, therefore, an amount of fuel in the pilot fuel injection during the negative valve overlap can be adjusted to increase as the main fuel injection(s) in the immediately preceding previous cycle of the cylinder decreases, and vice versa. Further, the amount of injection during the negative valve overlap can be adjusted to increase as the amount of excess air available for reaction with the pilot fuel injection of the cylinder increases, and vice versa.

Above, embodiments of the invention have been described with reference to engines with variable valve timing. However, the invention is also applicable to engines without such variable valve timing, for example, stationary engines with fixed valve timing and a standard camshaft. Such engines are often operated at fixed speeds and loads and are not subject to the transients normally occurring in, for instance, engines for vehicles. Hence a stationary engine can be operated continuously in HCCI-mode.

Also, an engine operating according to principles of the invention can be adapted to use most commonly available fuels, such as gasoline, ethanol, methanol, diesel, kerosene, natural gas, and others.

The invention claimed is:

1. A method in an engine system comprising an internal combustion engine having at least one cylinder at which a piston, at least one inlet valve, at least one exhaust valve, and a fuel injector, for injection of a fuel directly into the cylinder, are provided, the method comprising performing the following steps in at least one of the cylinder:
controlling the inlet valve so as to introduce air into the cylinder;
performing at least one main combustion fuel injection for a main combustion with air introduced into the cylinder;
controlling, during an exhaust stroke and an intake stroke, the inlet valve and the exhaust valve so as to form a negative valve overlap to capture main combustion residues; and
performing at least one pilot fuel injection during the negative valve overlap;
wherein the amount of fuel in the pilot fuel injection is at least partly dependent on said introduction of air and the main combustion fuel injection.

2. A method according to claim 1, further comprising:
introducing a first amount of air into the cylinder;
performing the main combustion fuel injection for a main combustion with the first amount of air;
capturing during the negative valve overlap, residues from the main combustion; and
determining the amount of fuel in the pilot fuel injection at least partly based on said first amount of air and the amount of fuel injected in the main combustion fuel injection.

3. A method according to claim 1, further comprising:
determining a flow of air into the cylinder;
determining a flow of fuel for a plurality of main combustion fuel injections for a plurality of main combustions with air introduced into the cylinder; and
determining the amount of fuel in the pilot fuel injection, at least partly based on the flow of air and the flow of fuel for the plurality of main combustion fuel injections.

4. A method according to claim 1, wherein the amount of fuel in the pilot fuel injection is such that a lambda value of a charge with the amount of fuel in the pilot fuel injection and a second amount of air in the residues from the main combustion captured in the negative valve overlap is higher than a predetermined lambda threshold value.

5. A method according to claim 4, wherein the predetermined lambda threshold value is 1.

6. A method according to claim 5, wherein the amount of fuel in the pilot fuel injection is such that said lambda value is within the range of 1.0-1.6.

7. A method according to claim 1, wherein the main combustion fuel injection is a first main combustion fuel injection, the method further comprising another main combustion fuel injection being a second main combustion fuel injection, the amount of fuel in the pilot fuel injection being determined partly based on the first and second main combustion fuel injections.

8. An engine system comprising an internal combustion engine having at least one cylinder at which a piston, at least one inlet valve, at least one exhaust valve, and a fuel injector, for injection of a fuel directly into the cylinder, are provided, the engine system further comprising an engine control unit, which is adapted to:
control the inlet valve so as to introduce air into the cylinder;
control the fuel injector so as to perform at least one main combustion fuel injection for a main combustion with air introduced into the cylinder;
control, during an exhaust stroke and an intake stroke, the inlet valve and the exhaust valve so as to form a negative valve overlap to capture main combustion residues;
control the fuel injector so as to perform at least one pilot fuel injection during the negative valve overlap; and
determine the amount of fuel in the pilot fuel injection at least partly in dependence on said introduction of air and at least one of the main combustion fuel injections.

9. A system according to claim 8, wherein the engine control unit is further adapted to:
control the inlet valve so as to introduce a first amount of air into the cylinder;
control the fuel injector so as to perform the main combustion fuel injection for the main combustion with the first amount of air;
control the inlet and exhaust valves so as to capture during the negative valve overlap residues from the main combustion; and
determine the amount of fuel in the pilot fuel injection at least partly based on said first amount of air and the amount of fuel injected in at least one of the main combustion fuel injections.

10. A system according to claim 8, wherein the engine control unit is further adapted to:
determine a flow of air into the cylinder;
determine a flow of fuel for a plurality of main combustion fuel injections for a plurality of main combustions with air introduced into the cylinder; and
determine the amount of fuel in the pilot fuel injection, at least partly based on the flow of air and the flow of fuel for the plurality of main combustion fuel injections.

11. A system according to claim 10, wherein the engine control unit is further adapted to determine the amount of fuel in the pilot fuel injection such that a lambda value of a charge with the amount of fuel in the pilot fuel injection and a second amount of air in the residues from the main combustion captured in the negative valve overlap is higher than a predetermined lambda threshold value.

12. A system according to claim 11, wherein the predetermined lambda threshold value is 1.

13. A system according to claim 12, wherein the engine control unit is adapted to determine the amount of fuel in the pilot fuel injection such that said lambda value is within the range of 1.0-1.6.

14. A system according to claim 13, wherein one of the main combustion fuel injections is a first main combustion fuel injection and another of the main combustion fuel injection is a second main combustion fuel injection, the engine control unit being adapted to determine the amount of fuel in the pilot fuel injection partly based on the first and second main combustion fuel injections.

15. A method in an engine system comprising an internal combustion engine having at least one cylinder, the method comprising:

operating the cylinder with a negative valve overlap between an inlet valve and an exhaust valve of the cylinder;

performing at least one pilot fuel injection during the negative valve overlap, where an amount of injection during the negative valve overlap is adjusted to increase as a main fuel injection in an immediately preceding cycle of the cylinder decreases, and where the amount of injection during the negative valve overlap is adjusted to increase as an amount of excess air available for reaction with the pilot fuel injection of the cylinder increases.

16. The method of claim 15 where the amount of injection during the negative valve overlap is adjusted to decrease as the main fuel injection in an immediately preceding cycle of the cylinder increases, and where the amount of injection during the negative valve overlap is adjusted to decrease as an amount of excess air available for reaction with the pilot fuel injection of the cylinder decreases.

* * * * *